Sept. 9, 1924.
M. R. KARGE ET AL
1,507,920
FLEXIBLE COUPLING
Filed Nov. 27, 1920     2 Sheets-Sheet 1
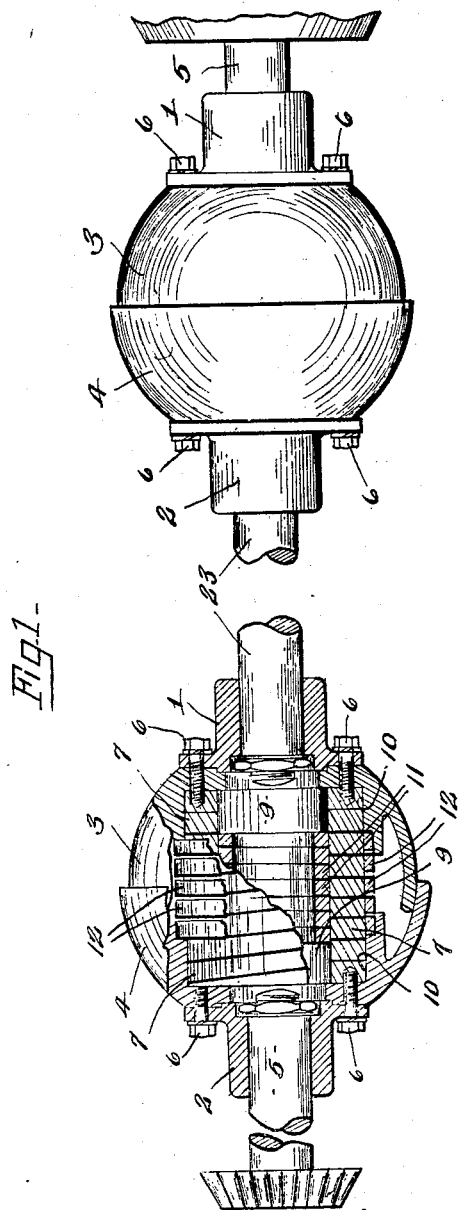
INVENTORS.
BY
ATTORNEYS.

Sept. 9, 1924.
M. R. KARGE ET AL
FLEXIBLE COUPLING
Filed Nov. 27, 1920 2 Sheets-Sheet 2
1,507,920
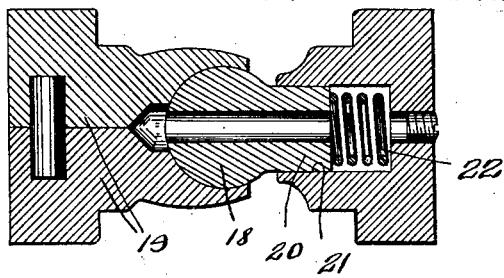
Fig. 3.
Fig. 2.
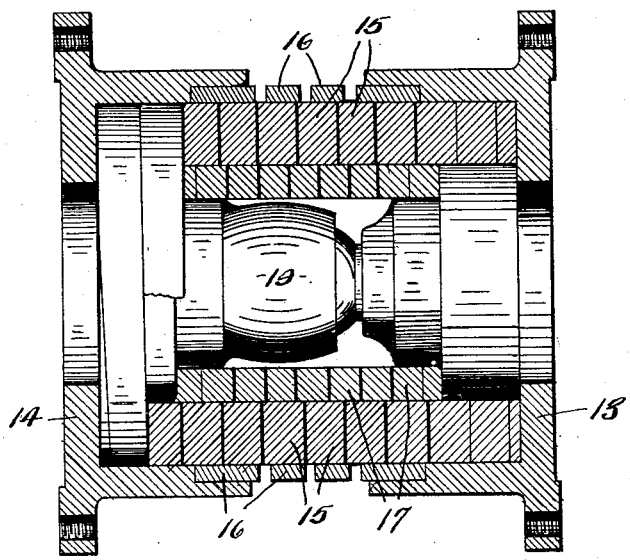
INVENTORS
BY
ATTORNEYS.

Patented Sept. 9, 1924.

1,507,920

UNITED STATES PATENT OFFICE.

MAXWELL R. KARGE AND FERNAN O. CONILL, OF PHOENIX, NEW YORK.

FLEXIBLE COUPLING.

Application filed November 27, 1920. Serial No. 426,841.

*To all whom it may concern:*

Be it known that we, MAXWELL R. KARGE and FERNAN O. CONILL, citizens of the United States and the Republic of Cuba, respectively, and residents of Phoenix, in the county of Oswego and State of New York, have invented a certain new and useful Flexible Coupling, of which the following is a specification.

This invention relates to flexible power transmitting elements or flexible couplings of the type set forth in the pending application of Maxwell R. Karge, Sr. No. 285,762, filed March 28, 1919, and has for its object a coupling which is particularly simple in construction, highly efficient and durable in use, and especially adapted for use in modern mechanics and automobile construction.

The invention consists in the novel features and in the combinations and constructions hereinafter set forth and claimed.

In describing this invention, reference is had to the accompanying drawings in which like characters designate corresponding parts in all the views.

Figure 1 is an elevation of a mechanism embodying a preferred form of our coupling, two couplings being shown, one in elevation and the other in section.

Figure 2 is a sectional view, partly in elevation of another form of my invention.

Figure 3 is a sectional view of parts shown in elevation in Fig. 2.

This power transmitting element or flexible coupling comprises driving and driven members connected by a ball and socket joint, and a coiled spring secured at its ends to said members for transmitting torque from one to the other.

1 and 2 designate respectively the driving and driven members formed respectively with a hollow ball 3 and a socket 4 in which the ball is arranged, the members 1 and 2 being mounted upon suitable shafts as 5.

As here shown, the members 1 and 3 or 2 and 4 are connected by screws 6.

7 designates the coiled torsion spring which as shown in Fig. 1 is located within the ball and socket and is secured at its ends respectively to the members 1 and 2, it being here shown as secured thereto by the screws 6, the end coils of the spring snugly enclosing disks 9 and snugly fitting cylindrical sockets 10 in the ball and socket members.

Means is provided against which the spring binds to limit the tensioning thereof so that after it has yielded a predetermined amount it will act as a rigid member, this means being located within the ball and socket and also concentric with the spring. As here shown, this means consists of inner and outer floating sleeves 11 and 12, the sleeves being cut spirally so as to be flexible or form in effect a plurality of sections.

These spirals or sleeves 11, 12 are disconnected from the ball and socket or the driving and driven members and when torque is applied to the spring in one direction, it will bind against the outer sleeve 12 and when torque is applied thereto in the other direction it will bind against the inner sleeve 11.

Also in order that liability of breaking of the spring may be reduced to a minimum, the spring is formed with flat opposing faces on the coils thereof and is preferably formed rectangular in cross section.

This spring is usually formed laminated as in the pending application of Maxwell R. Karge, Sr. No. 295,762 filed March 28, 1919.

As seen in Fig. 2, the ball and socket may be located within the spring. In Fig. 3, 13 and 14 are respectively, the driving and driven members which are secured to the driving and driven shafts. 15 is the spring connected to said driving and driven members. 16 and 17 are respectively, the outer and inner spiral sleeves. 18 is the ball associated with one member 13, and 19 is the socket associated with the other member 14, the socket being formed in sections as seen in Fig. 3 in order that the ball may be placed therein and one of the parts 18 or 19 is movable axially relatively to the other, here shown as the ball 18, which has a shank 20 movable in the passage 21 formed in the member 13, it being pressed outwardly by a spring 22.

In Fig. 1 is shown one use of this flexible coupling or universal joint, as used in a motor vehicle in which two flexible couplings are connected by a shaft 23, these couplings being connected respectively to the axle mechanism of a motor vehicle and to the change speed gearing.

What we claim is:

1. A flexible power transmitting coupling comprising members, one being formed with a socket and the other with a ball in the socket, and a spring located within the ball and socket and housed thereby and secured at one end to the socket member and at its other end to the ball member for transferring torque from one member to the other, substantially as and for the purpose set forth.

2. A flexible power transmitting coupling comprising driving and driven members, a coiled spring secured at its ends to said members respectively for transmitting the torque from one member to the other, and means arranged concentric with the spring for frictionally engaging the same to limit the flexing of the spring, said means including a floating coil on which the spring binds when under tension, substantially as and for the purpose specified.

3. A power transmitting coupling comprising driving and driven members, a coiled spring secured at its ends to said members, for transmitting the torque from one member to the other, and means arranged concentric with the spring for frictionally engaging the same to limit the flexing of the spring, said means including a floating coil encircling the spring and a floating coil located within the spring, substantially as and for the purpose set forth.

4. A flexible power transmitting coupling comprising two members, one formed with a socket and the other with a ball movable in the ball, a coiled spring located within the ball and the socket and secured at its ends thereto respectively for transmitting the torque from one member to the other, and means arranged within the ball and the socket and concentric with the spring and on which the spring binds when tensioned a predetermined amount, substantially as and for the purpose described.

5. A flexible power transmitting coupling comprising driving an driven members and the torsion spring connecting said members and secured at it sopposite ends thereto for transmitting torque from one member to the other, the coils of the spring having flat opposing faces arranged contiguous to each other for frictionally engaging each other as when the predetermined amount of torque is applied to the spring, substantially as and for the purpose set forth.

In testimony whereof, we have hereunto signed our names hereto at Syracuse, in the county of Onondaga, and State of New York, on the 30th day of October, 1920, and the 17th day of September, 1920, respectively.

MAXWELL R. KARGE.
FERNAN O. CONILL.